United States Patent Office 2,821,541
Patented Jan. 28, 1958

2,821,541

PRODUCTION OF DIALKYL 2,5-DIARYLAMINO-3,6-DIHYDROTEREPHTHALATES

William S. Struve, Chatham, N. J., assignor to E. I. du Pont de Nemours and Company, Wilmington, Del., a corporation of Delaware No Drawing. Application July 22, 1955
Serial No. 523,921

13 Claims. (Cl. 260—471)

This invention pertains to a novel process for preparing dialkyl 2,5-diarylamino-3,6-dihydro terephthalates, which may be represented by the formula

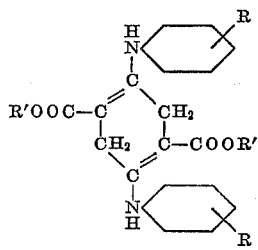

where R may be hydrogen, halogen, or an alkyl or alkoxy group containing from 1–4 carbon atoms, and R' is an alkyl group containing from 1–3 carbon atoms.

It is an object of the present invention to provide a novel and improved process for obtaining the above described compounds in high yields without necessitating individual separation and purification steps for each reaction of the process. The terephthalates thus produced are suitable for conversion into quinacridones, particularly by the process described in co-pending application Serial No. 523,922, filed July 22, 1955.

The objects of this invention are attained by condensing two mols of dialkyl succinate in a high boiling inert liquid in the presence of an alkaline catalyst to form dialkyl succinyl succinate, neutralizing the excess alkali, condensing the dialkyl succinyl succinate with aniline or other aromatic amine in the presence of an excess of the amine and a catalytic amount of a salt of the amine soluble in the reaction mixture, neutralizing the acid and removing the excess amine under non-oxidizing conditions.

In a preferred embodiment of this invention, about 3.5 mols of sodium ethylate is dispersed in "Dowtherm A" which is a eutectic mixture comprising 23.5% by weight of biphenyl and 76.5% by weight of diphenyl oxide. A convenient manner of obtaining this dispersion of sodium ethylate is to react metallic sodium with a solution of ethyl alcohol in "Dowtherm A." Diethyl succinate (2 mols) is then added to the mixture which is then heated to promote the condensation. When the reaction is complete, the excess alkali is neutralized with a slurry of sodium bicarbonate in water and the resulting aqueous layer removed. Aniline in large excess (about 10 mols or 5 times theory) is then added to the mixture, together with a small amount (about 0.035 mol) of aniline hydrochloride and the condensation is brought about by heating under vacuum with the removal of the water formed during the reaction. The acid is then neutralized with a solution of sodium carbonate in water after which the excess aniline is removed by distillation under vacuum. Finally, the vacuum is released by the introduction of an inert gas, preferably nitrogen, leaving as the final product a solution of diethyl 2,5-dianilino-3,6-dihydro-terephthalate in "Dowtherm A." This solution is ideally adapted for further cyclization to dihydro quinacridone as more fully set forth in the copending application Serial No. 523,922, filed July 22, 1955; or alternatively, the solution may be cooled, and the terephthalate separated by conventional methods; such as by distilling the solvent medium or by filtering followed by washing and drying of the collected filtrate.

For a clearer understanding of the invention, the following examples are presented. These examples are intended to be merely illustrative of the invention and not in limitation thereof.

Example 1

A suitable vessel for carrying out the process of this invention is a glass lined reactor equipped with an efficient agitator, a distillation column and a product condenser above the column. The vessel should be jacketed for control of temperature by circulation of a suitable heat transfer liquid. It should also be equipped for the application of a vacuum through the condenser system and for sweeping the atmosphere in the vessel with an inert gas.

250 parts of "Dowtherm A" (Dow Chemical Company) is charged to a vessel of this description and of such a size that it will not be more than about one-third filled. The contents of the vessel are heated to about 120° C. and oxygen is purged from the vessel by sweeping with nitrogen gas, then applying vacuum and relieving the vacuum with nitrogen gas. Then, 10.35 parts of sodium metal cut into small pieces is added and the charge is allowed to stand without agitation until the sodium is melted, whereupon the vessel is agitated vigorously to break up the molten sodium into small pellets. The charge is then cooled to 55–60° C. maintaining an atmosphere of nitrogen at all times. With the agitator running, 24 parts of anhydrous ethyl alcohol (denatured with 5% methanol) is then added slowly (over a period of about 6 hours) at such a rate that the temperature does not exceed about 75° C. After the addition of the alcohol, the temperature is maintained between 70 and 80° C. for about 2 hours. Then, 50 parts of diethyl succinate is added rapidly and the charge heated to 95–100° C. over a 2½ hour period and held at 95–100° C. for about 7 hours, maintaining good agitation and an amosphere of nitrogen at all times. The time of this latter period is not especially critical, and equally good results have been obtained at 14 hours. However, for ease of operation a period of 6–8 hours is preferred. The charge is then neutralized by adding a slurry of 40 parts sodium bicarbonate in about 200 parts of water at about 50° C., stirring for about 20 minutes, letting stand until an aqueous layer forms in the bottom of the vessel and drawing off the aqueous layer. The charge is then washed with a solution of 50 parts sodium chloride in 300 parts of water at about 70° C. and the aqueous layer again withdrawn from the bottom of the vessel. 160 parts of aniline is then added to the charge, followed by the addition of 0.55 part of aniline hydrochloride. Vacuum is then applied through the water cooled product condenser. With air circulating through the jacket of the distillation column, the charge is heated to 108–110° C. and the vacuum maintained at 34–35 mm. mercury absolute pressure while heating is continued for 3 hours. Any aniline carried over with the water given off by the condensation is replaced. At the end of the heating period the vacuum is relieved with nitrogen gas, the charge is cooled below 60° C. and a solution of 0.25 part sodium carbonate in 5.5 parts water is added and stirred for about 15 minutes. Vacuum is again applied and the temperature is maintained below 60° C. until all water is removed. The charge is then heated to about 140° C. at a pressure of 25 mm. mercury and distillation contained at a maximum temperature of 143° C. for about 6 hours until the aniline content of the distillate is less than 0.20%. The vacuum is then relieved with nitrogen gas and the charge is cooled while stirring in the presence of nitrogen to give a slurry of about 49.6 parts of diethyl 2,5-dianilino-3,6-dihydro terephthalate in "Dowtherm A." (88% of theory based on diethyl succinate used.) This material is then isolated by filtering and washing free of "Dowtherm A" with alcohol and then removing the alcohol in a drier to give a powder which is stable as long as it is kept substantially free of water.

The slurry of diethyl dianilino-dihydro-terephthalate in "Dowtherm A," however is ideally adapted for direct conversion into quinacridone as described in more detail in the aforementioned co-pending application, and when it is planned to use it for this purpose, isolation is neither necessary nor desirable and it may be advantageously used directly without even cooling.

Substituted anilines may be used in place of aniline in the above example to give the corresponding substituted terephthalic acid derivatives as follows:

*Example 2*

220 parts of parachloro aniline is used in place of aniline in the method of Example 1, and it yields diethyl di(4-chlor)anilino-dihydro-terephthalate.

*Example 3*

184 parts of p-toluidine is used in place of aniline in the method of Example 1 and it yields diethyl di-p-toluidino-dihydro-terephthalate.

*Example 4*

212 parts of p-anisidine is used in place of aniline in the method of Example 1 and it yields diethyl di(4-methoxy)anilino-dihydro-terephthalate.

It will be noted that the inert liquid used in the above examples is "Dowtherm A" which is a mixture of 23.5% biphenyl and 76.5% diphenyl oxide. This liquid medium is especially adaptable for the purposes of this invention since its boiling point is in a suitable range, and it is readily available as a commercial product in a sufficiently high state of purity. However, many other inert, relatively high boiling liquids can also be used as the medium for carrying out the reaction. The principal consideration, aside from inertness, is boiling point. The liquid should boil substantially higher than the arylamine used in the reaction in order to permit the removal of the latter by distillation. Examples of such materials include α methyl naphthalene, β methyl naphthalene, biphenyl, diphenyl oxide and mineral oils boiling above about 250° C. and mixtures of these liquids. The preferred boiling range is from about 240–300° C. However, higher boiling liquids can also be used although their higher boiling points may preclude their removal by distillation steps. "Dowtherm A" (B. P. 258° C.) is in the lower part of the preferred range. The amount of inert liquid medium used is not at all critical. However, it is desirable for reasons of economy to keep the amount of this liquid on the low side. Larger amounts will do no harm to the reaction, but will make its subsequent removal increasingly difficult. A preferred amount of the liquid medium is from about 4 to 10 times the weight of the diethyl succinate which is to be reacted.

The reaction of metallic sodium with ethyl alcohol to obtain sodium ethylate is conventional but the operation in the presence of the inert liquid shows many advantages in that it introduces a substantial element of control to reduce the violence sometimes associated with this reaction. It is, of course, entirely possible to use sodium ethylate prepared separately. A preferred range for the sodium ethylate is from about 2.2 to 4 mols for every 2 mols of diethyl succinate.

The condensation of 2 mols of diethyl succinate to form the cyclized diethyl succinyl succinate is a well known reaction. It is well known to use sodium ethylate as the catalyst for this reaction, but the usual conditions have specified a low boiling solvent such as ethyl ether. It is now found that the high boiling solvent such as "Dowtherm A" enables the reaction to go successfully with a minimum of by-products. These conditions also minimize the tendency of the reaction to reverse with the consequent hydrolysis of the diethyl succinyl succinate. The neutralization with sodium bicarbonate converts the insoluble disodium salt of the enol form of the cyclized ester to the soluble keto form of the free ester. Furthermore, since the above condensation reaction requires an alkaline catalyst and the subsequent reaction requires an acid catalyst, neutralizing at this point serves to prepare the reaction mixture for the introduction of the latter catalyst. In choosing the neutralizing agent, care should be taken to avoid strong acids since they will hydrolyze the ester in a manner very similar to the alkali. The alkali metal and alkaline earth metal bicarbonates and acid phosphates are examples of the type of neutralizing agents which are especially suitable. For example, it is convenient to use sodium bicarbonate or potassium bicarbonate, mono sodium phosphate, or mono calcium phosphate as a slurry in a small amount of water. When the neutralization is complete, the aqueous layer is separated by any convenient means, but it is not necessary that the separation be complete since water is formed during the next step and must be removed therefrom.

The condensation of an arylamine such as aniline with a beta keto ester such as diethyl succinyl succinate is acid catalysed, but the acid is effective only when it is soluble in the reaction mixture. To insure solubility, aniline is used in large excess; i. e., from about 2 to 10 times the theoretical amount required for reaction (preferably up to 5 times theory). In terms of mols, this would be from about 4 to 20 mols. The catalyst is chosen from the salts of aniline which are soluble in the mixture of aniline and the high boiling solvent. Aniline hydrochloride is ideally suited for this purpose, but the hydrobromide, the hydroiodide, the acetate, the nitrate and others, may also be used. If desired, the salt may be formed in situ by the direct addition of the corresponding acid to the amine. The preferred amount of catalyst is 0.25 mol percent based on the arylamine used. As little as 0.18 mol percent may be used or it may be increased to 0.71 mol percent without significantly affecting the reaction. It should also be pointed out that amounts in excess of the recited ranges are also contemplated, but as the acid content is increased a point will soon be reached where a further excess would serve no useful purpose since it would not be soluble in the reaction mixture.

The reaction with the arylamine results in the release of water and is a reversible reaction unless the water is removed. Also, it is sensitive to oxidizing conditions with the formation of impurities in considerable amount. Hence, it is convenient to carry out the reaction by heating under vacuum with constant removal of the water formed. The preferred temperature of reaction is about 110° C. However, it is effective within the range of about 90–130° C. At the preferred temperature, the optimum time of reaction is about 3 hours. This may be varied within the range of about 1 hour to 10 hours. At lower temperatures some increase in time is desirable. On the other hand, temperatures substantially in excess of about 130° C. result in the rapid formation of undesirable by-products, notably diphenyl urea, so that these higher temperatures must be avoided.

The aniline shown in Example 1 may be replaced by various substituted anilines, particularly the mono-chloroanilines, the monoalkyl anilines and the monalkoxy anilines containing from 1–4 carbon atoms. Specific examples of suitable compounds include p-chloroaniline, p-bromoaniline, p-fluoroaniline, p-iodoaniline, o-chloroaniline, ortho toluidine, meta toluidine, p-butylaniline, p-anisidine and p-butoxyaniline. The neutralizing agents which are used in the final neutralization may be any non-hydrolyzing mild alkali. Examples of suitable materials are sodium carbonate, potassium carbonate, sodium bicarbonate and potassium bicarbonate.

Example 1 above shows the introduction of nitrogen as an inert gas to relieve the vacuum. However, the only requirement of the gas used is that it be inert and free from oxygen. Thus, carbon dioxide could be used if sufficiently pure, as well as helium or other inert gas. Nitrogen is preferred because it is readily available at a low cost in a pure form. But it is not intended to exclude the use of other inert gases.

While the examples have been concerned with diethyl 2,5-diarylamino-3,6-dihydro-terephthalate, it should be understood that the corresponding methyl and propyl derivatives can be prepared in the same manner by starting with the methyl or propyl ester of succinic acid. In preparing a particular derivative, it should be remembered that the corresponding alcoholate should be used in order to prevent an ester interchange. For example, if dipropyl 2,5-diarylamino-3,6-dihydroterephthalate is to be prepared one would start with dipropyl succinate and sodium propylate.

Although this invention finds its greatest use in the preparation of intermediates in a form suitable for direct cyclization to dihydro quinacridones, these intermediates can be isolated from the liquid carrier and obtained in a dry form suitable for any other use to which they may be put. For example, diethyl 2,5-dianilino-3,6-dihydro-terephthalate can be used to prepare diethyl 2,5-dianilino-3,6-terephthalate and dianilino terephthalic acid.

The process of this invention offers distinct advantages in the preparation of diethyl 2,5-dianilino-3,6-dihydro-terephthalate. The yields obtained are remarkably high and the formation of undesirable by-products is reduced to a minimum. Furthermore, the use of a common solvent or carrier for all steps in the reaction makes it possible to proceed to the final product without any intermediate isolation steps.

I claim:

1. A process for preparing diethyl diarylamino dihydro terephthalate which comprises carrying out the following steps under non-oxidizing conditions, condensing two mols of diethyl succinate to diethyl succinyl succinate in an inert high boiling liquid in the presence of an alkaline catalyst, neutralizing the reaction mixture, condensing the diethyl succinyl succinate present in the reaction mixture with 2 mols of an arylamine having the following formula

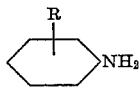

where R is selected from the group consisting of hydrogen, halogen, and alkyl and alkoxy groups containing from 1–4 carbon atoms, in the presence of an excess of the amine and a dissolved acid catalyst, neutralizing the reaction mixture thus obtained and removing the excess amine.

2. A process for preparing diethyl 2,5-diarylamino-3,6-dihydro-terephthalate which comprises carrying out the following steps under non-oxidizing conditions, condensing 2 mols of diethyl succinate to diethyl succinyl succinate in an inert liquid boiling within the range of from about 240–300° C. in the presence of an alkaline catalyst, neutralizing the reaction mixture, condensing the diethyl succinyl succinate present in the reaction mixture with 2 mols of an arylamine having the following formula

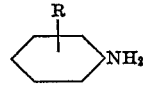

where R is selected from the group consisting of hydrogen and halogen, and alkyl and alkoxy groups containing from 1–4 carbon atoms, in the presence of an excess of the amine and a dissolved catalyst, neutralizing the reaction mixture thus obtained and removing the excess amine.

3. A process for preparing diethyl 2,5-diarylamino-3,6-dihydro-terephthalate which comprises carrying out the following steps under non-oxidizing conditions, condensing 2 mols of diethyl succinate to diethyl succinyl succinate in a mixture of biphenyl and diphenyl oxide in the presence of an alkaline catalyst, neutralizing the reaction mixture, condensing the diethyl succinyl succinate present in the reaction mixture with 2 mols of an arylamine having the following formula

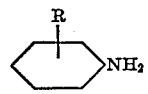

where R is selected from the group consisting of hydrogen and halogen, and alkyl and alkoxy groups containing from 1–4 carbon atoms, in the presence of an excess of the amine and a dissolved acid catalyst, neutralizing the reaction mixture thus obtained and removing the excess amine.

4. A process for preparing diethyl 2,5-diarylamino-3,6-dihydro-terephthalate which comprises carrying out the following steps under non-oxidizing conditions, condensing 2 mols of diethyl succinate to diethyl succinyl succinate in biphenyl in the presence of an alkaline catalyst, neutralizing the reaction mixture, condensing the diethyl succinyl succinate present in the reaction mixture with 2 mols of an arylamine having the following formula

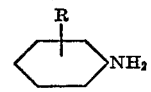

where R is selected from the group consisting of hydrogen and halogen, and alkyl and alkoxy groups containing from 1–4 carbon atoms, in the presence of an excess of the amine and a dissolved acid catalyst, neutralizing the reaction mixture thus obtained and removing the excess amine.

5. A process for preparing diethyl 2,5-dianilino-3,6-dihydro-terephthalate which comprises carrying out the following steps under non-oxidizing conditions, condensing 2 mols of diethyl succinate to diethyl succinyl succinate in an inert high boiling liquid in the presence of an alkaline catalyst, neutralizing the reaction mixture, condensing the diethyl succinyl succinate present in the reaction mixture with 2 mols of aniline in the presence of an excess of aniline and a dissolved acid catalyst, neutralizing the reaction mixture thus obtained and removing excess aniline.

6. A process for preparing diethyl 2,5-dianilino-3,6-dihydro-terephthalate which comprises carrying out the following steps under non-oxidizing conditions, condensing 2 mols of diethyl succinate to diethyl succinyl succinate in an inert high boiling liquid in the presence of an alkaline catalyst, neutralizing the reaction mixture, condensing the diethyl succinyl succinate present in the reaction mixture with 2 mols of aniline in the presence of an excess of from 2 to 18 mols of aniline and a dissolved acid catalyst, neutralizing the reaction mixture thus obtained and removing the excess aniline.

7. A process for preparing diethyl 2,5-di(4-chlor)anilino-3,6-dihydro-terephthalate which comprises carrying out the following steps under non-oxidizing conditions, condensing 2 mols of diethyl succinate to diethyl succinyl succinate in an inert high boiling liquid in the presence of an alkaline catalyst, neutralizing the reaction mixture, condensing the diethyl succinyl succinate present in the reaction mixture with 2 mols of p-chloro aniline in the presence of an excess of from about 2 to 18 mols of p-chloro aniline and a dissolved acid catalyst, neutralizing the reaction mixture thus obtained and removing the excess amine.

8. A process for preparing diethyl 2,5-di-p-toluidino-3,6-dihydro-terephthalate which comprises carrying out the following steps under non-oxidizing conditions, condensing 2 mols of diethyl succinate to diethyl succinyl succinate in an inert high boiling liquid in the presence of an alkaline catalyst, neutralizing the reaction mixture, condensing the diethyl succinyl succinate present in the reaction mixture with 2 mols of p-toluidine in the presence of an excess of from about 2 to 18 mols of p-toluidine and a dissolved acid catalyst, neutralizing the reaction mixture thus obtained and removing the excess amine.

9. A process for preparing diethyl 2,5-di(4-methoxy) anilino-3,6-dihydro-terephthalate which comprises carrying out the following steps under non-oxidizing conditions, condensing 2 mols of diethyl succinate to diethyl succinyl succinate in an inert high boiling liquid in the presence of an alkaline catalyst, neutralizing the reaction mixture, condensing the diethyl succinyl succinate present in the reaction mixture with 2 mols of p-anisidine in the presence of an excess of from about 2 to 18 mols of p-anisidine and a dissolved acid catalyst, neutralizing the reaction thus obtained and removing the excess amine.

10. A process for preparing diethyl 2,5-diaryl-amino-3,6-dihydro-terephthalate which comprises carrying out the following steps under non-oxidizing conditions, condensing 2 mols of diethyl succinate to diethyl succinyl succinate in a mixture of biphenyl and diphenyl oxide with sodium ethylate as a catalyst, neutralizing the reaction mixture with an aqueous slurry of a neutralizing agent selected from the group consisting of sodium bicarbonate, mono sodium phosphate and mono calcium phosphate, and separating the aqueous layer obtained, condensing the diethyl succinyl succinate present in the reaction mixture with 2 mols of an arylamine compound having the formula

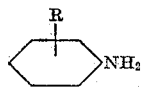

where R is selected from the group consisting of hydrogen, halogen, and alkyl and alkoxy groups containing from 1–4 carbon atoms, in the presence of an excess of from 2 to 18 mols of said amine and a dissolved acid catalyst, neutralizing the reaction mixture with an aqueous slurry of sodium carbonate and removing the water and then removing the excess amine.

11. A process for preparing diethyl 2,5-dianilino-3,6-dihydro-terephthalate which comprises carrying out the following steps under non-oxidizing conditions, condensing 2 mols of diethyl succinate to diethyl succinyl succinate in a mixture of biphenyl and diphenyl oxide with sodium ethylate as a catalyst, neutralizing the reaction mixture with an aqueous slurry of a neutralizing agent selected from the group consisting of sodium bicarbonate, mono sodium phosphate, and mono calcium phosphate, and separating the aqueous layer obtained, condensing the diethyl succinyl succinate present in the reaction mixture with 2 mols of aniline in the presence of an excess of from 2 to 18 mols of aniline and a dissolved acid catalyst, neutralizing the reaction mixture with an aqueous slurry of sodium carbonate and removing the water and then removing the excess aniline.

12. A process for preparing diethyl 2,5-diarylamino-3,6-dihydro-terephthalate which comprises condensing in a high boiling inert liquid under non-oxidizing conditions 1 mol of diethyl succinyl succinate with 2 mols of an amine having the formula

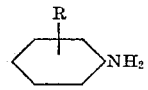

where R is selected from the group consisting of hydrogen, halogen, and alkyl and alkoxy groups containing from 1–4 carbon atoms, in the presence of an excess of the amine and a dissolved acid catalyst, neutralizing the reaction mixture thus obtained and removing the excess amine.

13. A process for preparing diethyl diethyl 2,5-dianilino-3,6-dihydro-terephthalate which comprises condensing in a mixture of biphenyl and diphenyl oxide under non-oxidizing conditions 1 mol of diethyl succinyl succinate with 2 mols of aniline in the presence of an excess of aniline and a dissolved acid catalyst, neutralizing the reaction mixture and removing the excess aniline.

References Cited in the file of this patent

UNITED STATES PATENTS

| | | |
|---|---|---|
| 2,577,900 | Lisk | Dec. 11, 1951 |
| 2,734,077 | Smith | Feb. 7, 1956 |

U. S. DEPARTMENT OF COMMERCE
PATENT OFFICE

CERTIFICATE OF CORRECTION

Patent No. 2,821,541 January 28, 1958

William S. Struve

It is hereby certified that error appears in the printed specification of the above numbered patent requiring correction and that the said Letters Patent should read as corrected below.

Column 8, line 30, strike out "diethyl", first occurrence.

Signed and sealed this 8th day of April 1958.

(SEAL)
Attest:
KARL H. AXLINE
Attesting Officer

ROBERT C. WATSON
Commissioner of Patents